(12) United States Patent
Zhang (10) Patent No.: US 9,630,108 B2
(45) Date of Patent: Apr. 25, 2017

(54) METHOD AND APPARATUS FOR TESTING GAME DATA

(71) Applicant: TENCENT TECHNOLOGY (SHENZHEN) COMPANY LIMITED, Shenzhen (CN)

(72) Inventor: Xin Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 436 days.

(21) Appl. No.: 14/186,044

(22) Filed: Feb. 21, 2014

(65) Prior Publication Data

US 2014/0295926 A1    Oct. 2, 2014

Related U.S. Application Data

(63) Continuation of application No. PCT/CN2013/088161, filed on Nov. 29, 2013.

(30) Foreign Application Priority Data

Apr. 1, 2013 (CN) .......................... 2013 1 0112359

(51) Int. Cl.
*A63F 13/58*  (2014.01)
*A63F 13/833*  (2014.01)
(Continued)

(52) U.S. Cl.
CPC .............. *A63F 13/58* (2014.09); *A63F 13/67* (2014.09); *A63F 13/833* (2014.09); *A63F 13/33* (2014.09)

(58) Field of Classification Search
CPC .................................. A63F 13/005; A63F 9/34
See application file for complete search history.

(56) References Cited

U.S. PATENT DOCUMENTS 6,162,120 A * 12/2000 Takahashi ............... A63F 13/10
463/23
6,319,121 B1 * 11/2001 Yamada .................. A63F 13/10
273/148 B (Continued)

FOREIGN PATENT DOCUMENTS

CN          101377799 A    3/2009
WO       2005008428 A2    1/2005

OTHER PUBLICATIONS

The World Intellectual Property Organization (WIPO) International Search Report for PCT/CN2013/088161 Mar. 6, 2014.

*Primary Examiner* — Kang Hu
*Assistant Examiner* — Malina D Blaise
(74) *Attorney, Agent, or Firm* — Anova Law Group, PLLC (57) ABSTRACT

Methods and apparatus for testing game data are provided. In a network game to be tested, skill effect data of a character to be tested can be obtained, and a combat strategy can be formulated accordingly. The network game along with a fight test of the character can be implemented, according to the combat strategy, to obtain and output testing data. Whether the combat strategy needs to be adjusted can then be determined. When the combat strategy is determined that needs to be adjusted, the methods and apparatus can be used to adjust the combat strategy, implement the fight test of the character according to the adjusted combat strategy, and obtain the testing data. When the combat strategy is determined that does not need to be adjusted, the methods and apparatus can be used to analyze a degree of balance of the character in the network game.

19 Claims, 6 Drawing Sheets

(51) Int. Cl.
   *A63F 13/67*   (2014.01)
   *A63F 9/34*    (2006.01)
   *A63F 13/33*   (2014.01)

(56) References Cited

U.S. PATENT DOCUMENTS

| | | | |
|---|---|---|---|
| 6,701,514 B1* | 3/2004 | Haswell | G06F 11/3664 |
| | | | 707/999.102 |
| 6,907,546 B1* | 6/2005 | Haswell | G06F 11/3684 |
| | | | 714/38.11 |
| 7,386,524 B2* | 6/2008 | Hubbell | G09B 5/06 |
| | | | 706/11 |
| 2006/0026506 A1* | 2/2006 | Kristiansen | G06F 11/3688 |
| | | | 715/243 |
| 2006/0059253 A1* | 3/2006 | Goodman | G06Q 10/10 |
| | | | 709/223 |
| 2006/0178918 A1* | 8/2006 | Mikurak | G06Q 10/06 |
| | | | 705/7.25 |
| 2008/0268943 A1 | 10/2008 | Jacob | |
| 2012/0204153 A1* | 8/2012 | Peterson | G06F 11/3672 |
| | | | 717/124 |
| 2013/0263090 A1* | 10/2013 | Polk | G06F 11/3672 |
| | | | 717/124 |
| 2014/0181591 A1* | 6/2014 | Bijanki | G06F 11/3684 |
| | | | 714/38.1 |

\* cited by examiner

METHOD AND APPARATUS FOR TESTING GAME DATA

CROSS-REFERENCES TO RELATED APPLICATIONS

This application is a continuation application of PCT Patent Application No. PCT/CN2013/088161, filed on Nov. 29, 2013, which claims priority to Chinese Patent Application No. 201310112359.3, filed on Apr. 1, 2013, the entire contents of which are incorporated herein by reference.

FIELD OF THE DISCLOSURE

The disclosure relates to the application field of data testing technology and, more particularly, relates to methods and apparatus for testing game data.

BACKGROUND

As network technology develops, network (e.g., online) games become more and more popular, especially those games involving role-playing, real-time, combat-type network games. The players may experience fight fun against different players in the network, by playing different occupation roles. In such games, the degree of balance of a character may be used as an important indicator for evaluating the games. For example, when the character does not have a good degree of balance, i.e., the character may be designed too strong or too weak, the player may be led to select this character more often or less often. This may cause the character to lose its original meaning as designed and cause the entire game un-balanced, generating reduced interest to the players.

Currently, the degree of balance of a character in a game is usually tested by game operators to collect game data, including use rate, methods for adding points to a skill, and game winning rate of the players, during an actual running process of the network game. Such testing requires a large amount of time, and the testing results are often influenced by network quality, game client device performance of the player, game player's operation level, and/or other factors. Such testing is therefore lack of objectivity and has low testing efficiency. It is therefore desirable to improve testing efficiency of network games and to improve objectivity of the testing results.

BRIEF SUMMARY OF THE DISCLOSURE

One aspect of the present disclosure includes a method for testing game data. The method can include obtaining skill effect data of a character to be tested and formulating a combat strategy according to the skill effect data of the character to be tested. A network game to be tested and a fight test of the character to be tested can be implemented, according to the combat strategy, to obtain and output testing data. According to the testing data, whether the combat strategy needs to be adjusted can be determined. When the combat strategy is determined that needs to be adjusted, the method can include adjusting the combat strategy, implementing the fight test of the character to be tested according to the adjusted combat strategy, and obtaining the testing data. When the combat strategy is determined that does not need to be adjusted, the method can include analyzing a degree of balance of the character to be tested in the network game to be tested according to the testing data.

Another aspect of the present disclosure includes an apparatus for testing game data. The apparatus can include a combat strategy formulating module, a testing module, a combat strategy determining module, a combat strategy adjusting module, and a balance degree analyzing module. The combat strategy formulating module can be configured to obtain skill effect data of a character to be tested and to formulate a combat strategy according to the skill effect data of the character to be tested. The testing module can be configured to implement a network game to be tested, to implement a fight test of the character to be tested in the network game according to the combat strategy formulated by the combat strategy formulating module and provide testing data, and to obtain and output the testing data. The combat strategy determining module can be configured to determine whether the combat strategy needs to be adjusted according to the testing data outputted by the testing module. The combat strategy adjusting module can be configured, when the combat strategy is determined that needs to be adjusted by the combat strategy determining module, to adjust the combat strategy, to call the testing module to implement the fight test of the character to be tested according to the adjusted combat strategy, and to obtain the testing data. The balance degree analyzing module can be configured, when the combat strategy is determined that does not need to be adjusted by the combat strategy determining module, to analyze a degree of balance of the character to be tested in the network game to be tested according to the testing data outputted by the testing module.

Another aspect of the present disclosure includes a non-transitory computer-readable medium having computer program. When being executed by a processor, the computer program performs a method for testing game data. The method comprises obtaining skill effect data of a character to be tested, formulating a combat strategy according to the skill effect data of the character to be tested, and implementing a network game to be tested. The method also includes implementing a fight test of the character to be tested in the network game, according to the combat strategy and providing testing data, obtaining and outputting the testing data, and determining whether the combat strategy needs to be adjusted according to the testing data. Further, the method includes, when the combat strategy is determined that needs to be adjusted, adjusting the combat strategy, implementing the fight test of the character to be tested according to the adjusted combat strategy, and obtaining the testing data or, when the combat strategy is determined that does not need to be adjusted, analyzing a degree of balance of the character to be tested in the network game to be tested according to the testing data.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

An exemplary method for testing game data can be implemented in a client device (or a game client device) to test network (or on-line) game data. The game client device can include a smart phone, a tablet computer, a laptop computer, and/or a desktop computer. The network game to be tested can be pre-configured in the game client device. In the other embodiments, the disclosed methods for testing game data can be used in a testing system including one or more game client devices and a game server.

Figure 8:
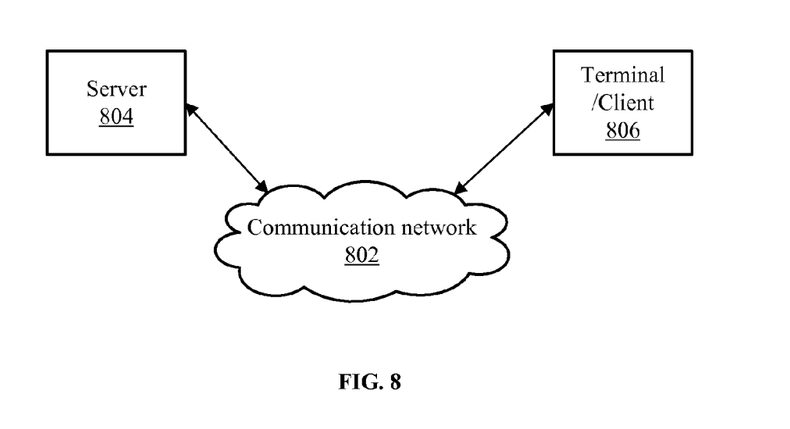
FIG. 8 depicts an exemplary environment incorporating certain disclosed embodiments.

For example, FIG. 8 depicts an exemplary environment 800 incorporating certain disclosed embodiments. As shown in FIG. 8, environment 800 may include a server 804, a terminal or a client 806, and/or a communication network 802. The server 804 and the client 806 may be coupled through the communication network 802 for information exchange, such as obtaining web data. Although only one client 806 and one server 804 are shown in the environment 800, any number of clients 806 or servers 804 may be included, and other devices may also be included.

Communication network 802 may include any appropriate type of communication network for providing network connections to the server 804 and client 806 or among multiple servers 804 or clients 806. For example, communication network 802 may include the Internet or other types of computer networks or telecommunication networks, either wired or wireless.

A terminal or a client, as used herein, may refer to any appropriate user terminal with certain computing capabilities, such as a personal computer (PC), a work station computer, a server computer, a hand-held computing device (tablet), a smart phone or mobile phone, or any other user-side computing device. Such terminals can be used as a client device or a game client device as disclosed herein.

A server, as used herein, may refer to one or more server computers configured to provide certain server functionalities, such as database management and search engines. A server may also include one or more processors to execute computer programs in parallel. In one embodiment, the server can be used as a game server as desired.

Figure 9:
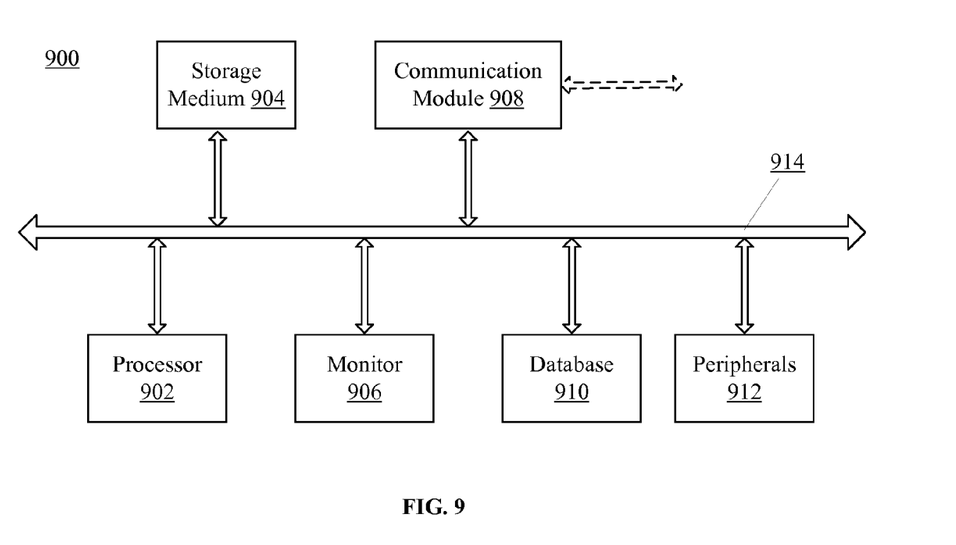
FIG. 9 depicts a block diagram of an exemplary computer system in accordance with various disclosed embodiments.

Server 804 and/or client 806 may be implemented on any appropriate computing platform. FIG. 9 shows a block diagram of an exemplary computing system 900 capable of implementing server 804 and/or client 806.

As shown in FIG. 9, computing system 900 may include a processor 902, a storage medium 904, a monitor 906, a communication module 908, a database 910, and/or peripherals 912. Certain devices may be omitted and other devices may be included.

Processor 902 may include any appropriate processor or processors. Further, processor 902 can include multiple cores for multi-thread or parallel processing. Storage medium 904 may include memory modules, such as ROM, RAM, flash memory modules, and erasable and rewritable memory, and mass storages, such as CD-ROM, U-disk, and hard disk, etc. Storage medium 904 may store computer programs for implementing various processes, when executed by processor 902.

Further, peripherals 912 may include I/O devices such as keyboard and mouse, and communication module 908 may include network devices for establishing connections through the communication network 902. Database 910 may include one or more databases for storing certain data and for performing certain operations on the stored data, such as database searching.

Figure 1:
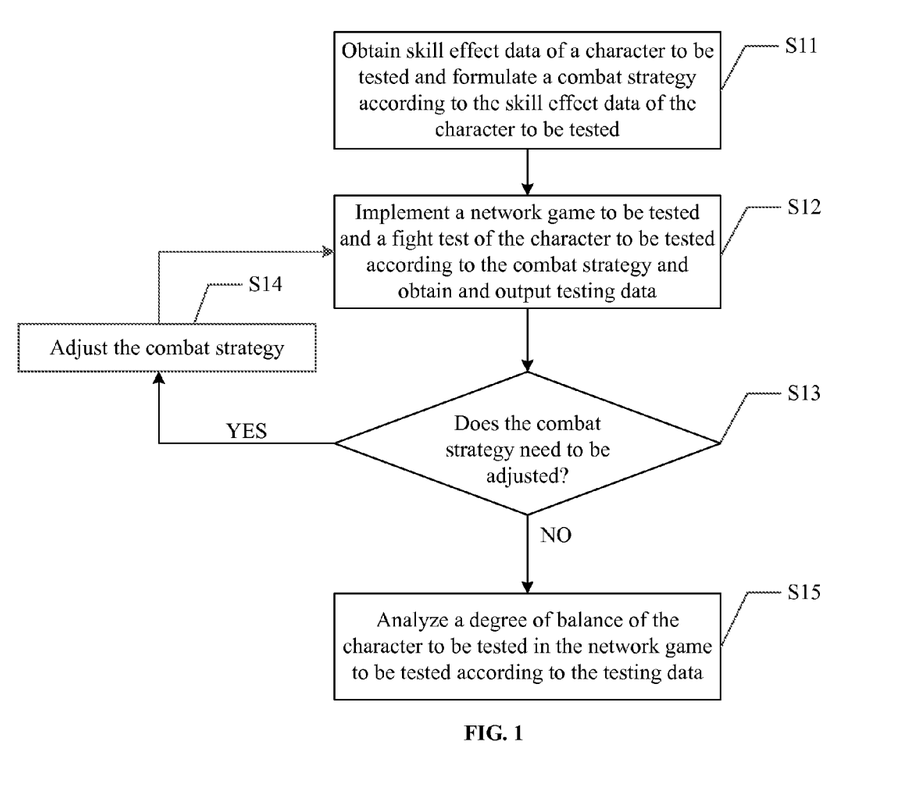
FIG. 1 is a flow chart of an exemplary method for testing game data in accordance with various disclosed embodiments.

FIG. 1 is a flow chart of an exemplary method for testing game data in accordance with various disclosed embodiments.

In Step S11, skill effect data of a character to be tested is obtained. A combat strategy is formulated according to the skill effect data of the character to be tested.

The character to be tested can include a first character to be tested and a second character to be tested. The first character to be tested and the second character to be tested can implement a one-to-one fight (e.g., including player killing, PVP) casting different skills in opposite positions against each other in network game to be tested. Generally, in a condition as one party's hit point (HP) decreases down to 0, in this condition, the other party (other participant) can be considered as a winner and the fight is ended.

The skill effect data of the character to be tested includes skill hurt grading data, additional effect data of a skill, equipment parameter data, optimum conjuring distance data of a skill, or status data of a key skill, of the character to be tested. For example, the key skill can play a critical role on fight victory or defeat and can include, e.g., skills with high hurt value, with high use rate, etc. According to the skill effect data of the character to be tested, a corresponding combat strategy can be formulated for the first character to be tested or for the second character to be tested.

The combat strategy can include a fighting mode implemented by the first character to be tested or the second character to be tested in a PVP fight, and can include multiple action strategies, such as, for example, an occupation strategy, a casting skill strategy, a priority strategy for skill casting when using continuous and combined skills, a strategy for implementing a weapon and an equipment, etc.

For example, one occupation may correspond to multiple specific skills. In an example of Tencent network game of QQ Defeat Dragon, six types of occupation are set in the game, the six types of occupation respectively correspond to multiple specific skills. For example, an occupation of Fan-Tian-Po corresponds to specific skills including Feng-Lei, Wan-Miao, Luo-Han, and Jin-Gang. An occupation of Shu-Shan-Jian corresponds to specific skills including Jian-Wu, Wen-Liu, Wan-Jian, Chang-He, Liang-Yi, Qi-Qiao, San-Guang, Ren-Jian, etc.

Such multiple skills can cause different skill hurt to the opponent in the PVP game. Some skills may interact with one another. As such, in one PVP combat strategy, the character to be tested can be preset to cast at least one skill. The higher the grading of the skill hurt, the higher casting priority can be.

In Step S12, a network game to be tested is implemented. According to the combat strategy, a fight test of the character to be tested in the network game is implemented. Testing data can then be obtained and outputted.

According to the combat strategy formulated in Step S11, a script editing tool can be called to use the script language to compile testing script of the network game to be tested. The network game to be tested can be implemented via implementing the testing script, and the fight test of the character to be tested can be implemented according to the combat strategy in the testing script.

The obtaining of the testing data can include obtaining combat data of the first character to be tested and the second character to be tested. When the fighting between the first character to be tested and the second character to be tested is implemented to after an adjusting stage of the preset combat strategy, the obtained combat data can be counted and the counted combat data can be outputted as a part of the testing results, i.e., as the testing data. According to the practical testing request, the following factors of the character to be tested of one party can be used as determination criteria for an adjusting stage of the preset combat strategy. These factors can include a degree of a continued skill casting, whether the preset testing time is achieved, whether a preset casting time of a single skill is achieved, or whether a HP reaches a preset threshold value.

According to a pre-obtained testing request inputted by a user, the outputted testing data can include including a fight winning rate, skill hurt data/value, controlled time data, status data, and effective actions per minute (EAPM) of the character to be tested. For example, the fight winning rate of the character to be tested can refer to a rate that a first test character to be tested defeated the second character to be tested in multiple PVP games between the first test character to be tested and the second character to be tested. The skill hurt value can refer to a hurt value caused by a single skill to an opponent that is cast by the single skill. For example, the skill hurt value can be a reduced amount of an HP value of the opponent that the skill cast to. EAPM can refer to the total of the actions per minute after repeated and useless actions are filtered out. The actions can include clicking by the mouse and striking of the keyboard.

In Step S13, according to the testing data, it is determined whether the combat strategy needs to be adjusted.

For example, when the testing data meet preset conditions (e.g. an actual skill hurt value is substantially consistent with the skill effect data of the character to be tested obtained in Step S11), the combat strategy can be considered to be optimal with no need for any adjustment. Otherwise, when the testing data do not meet the preset conditions, the combat strategy can be considered misemployed and needs to be adjusted.

When the combat strategy is determined that needs to be adjusted, Step S14 can be performed to adjust the combat strategy, followed by returning to perform Step S12 to implement the fight test of the character to be tested according to the adjusted combat strategy, and to obtain and output the testing data.

The adjusting the combat strategy can include optimizing the character to be tested by increasing the fighting capacity and the defensive capacity; and include modifying: equipment parameter data, skill selecting priority data of the character to be tested, etc.

When the fighting between the first character to be tested and the second character to be tested is implemented to after an adjusting stage of the preset combat strategy, the combat strategy of the first character to be tested can be adjusted according to the testing data of the first character to be tested. Testing script can be re-compiled according to the adjusted combat strategy, and can be used to implement the network game to be tested for another round of testing.

When the adjustment of the combat strategy is accomplished, the fight test of the character to be tested can be implemented according to the adjusted combat strategy, and the testing data can be obtained and outputted. When the combat strategy is determined that does not need to be adjusted, Step S15 can be implemented by analyzing a degree of balance of the character to be tested in the network game to be tested according to the testing data.

When the combat strategy is determined that does not need to be adjusted, the fighting/combat can be considered as ended. Because the testing is circulatingly performed, the testing data used for analyzing the degree of balance of the character to be tested in the network game to be tested can be summarized testing data summarized from multiple rounds of such testing and can be used as final testing data after the fighting is ended.

Analyzing a degree of balance of the character to be tested in the network game to be tested according to the outputted summarized testing data can include the following analyzed results including, e.g., a fight winning rate.

In a first example, assuming an arbitrary strategy selected from multiple combat strategies for an occupation used by the first character to be tested can restrain all of combat strategies of an occupation used by the second character to be tested, the occupation used by the first character to be tested can be considered that restrains the occupation used by the second character to be tested. At this time, the occupation of the second character to be tested can be adjusted for another testing to screen out another occupation which can restrain the occupation used by the first character to be tested. When the screening result is 0, the occupation used by the first character to be tested can be considered having a stronger positioning in the network game to be tested.

In a second example, assuming the occupation used by the first character to be tested does not have any combat strategies that can achieve a relatively higher winning rate, when fighting with multiple occupations, the occupation used by the first character to be tested can be considered having a weaker positioning in the network game to be tested.

In a third example, assuming there are mutual chances for victory or defeat between the occupation used by the first character to be tested and the occupation used by the second character to be tested, and the first character to be tested requires a higher EAPM, the operative difficulty index of the occupation used by the first character to be tested can be considered relatively higher. The higher the operative difficulty index, the more difficult to play a full strength in the fight/combat, and the lower of the fight winning rate can be in practical running data.

In a fourth example, hurt values or controlled times caused by all types of skill can be respectively extracted for a victory and/or defeat, key skills can be determined from all of the skills, and the role played by all types of skills in a fight/combat can be estimated.

The disclosed method for testing game data can combine theoretical data with the actual testing results; compile testing scripts according to combat strategies to implement network game to be tested; greatly simulate PVP combat processes in the network game to be tested; constantly adjust combat strategies during the combat according to status of fighting opponents. In this manner, the combat processed can be more close to actual operations of the players. Probability of fight winning of the character to be tested can be obtained under the condition that the player does not mistakenly perform operations. Characters in the game, and/or skill level can be objectively reflected. Interference of the skill level of the players or other factors can be eliminated. Objectivity of the testing data can be improved and the testing time can be reduced, thereby increasing testing efficiency.

Figure 2:
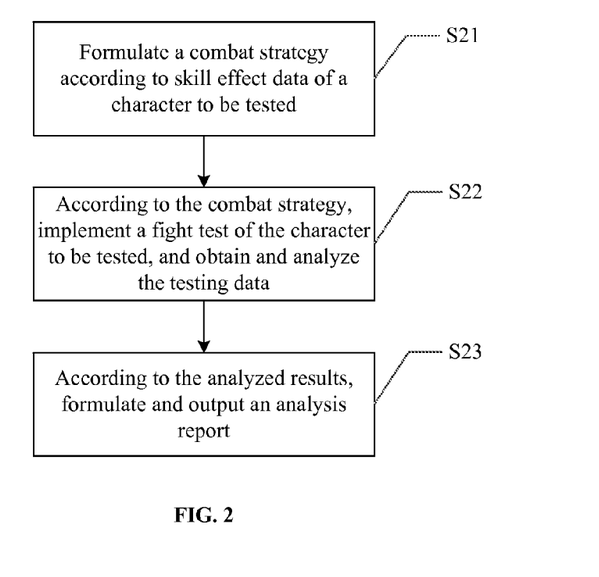
FIG. 2 is a flow chart of another exemplary method for testing game data in accordance with various disclosed embodiments.

FIG. 2 is a flow chart of another exemplary method for testing game data in accordance with various disclosed embodiments;

In Step S21, a combat strategy is formulated according to skill effect data of a character to be tested. The character to be tested can include a first character to be tested and a second character to be tested. The combat strategy can include a combat strategy of the first character to be tested and a combat strategy of the second character to be tested.

Figure 3:
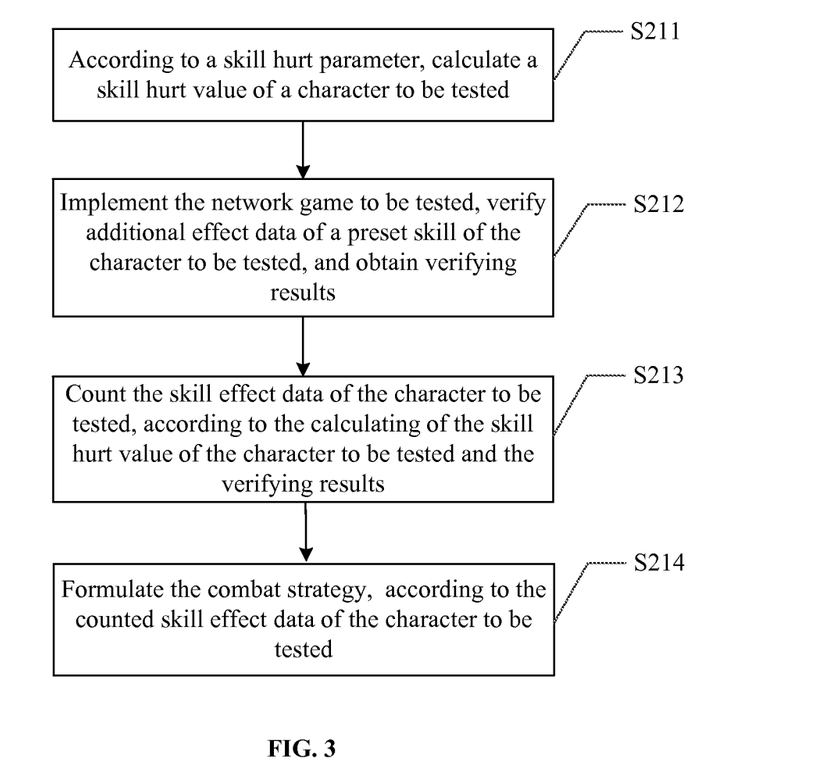
FIG. 3 is a flow chart of an exemplary Step S21 in FIG. 2 in accordance with various disclosed embodiments.

As shown in FIG. 3, an exemplary Step S21 can include the following. In Step S211, according to a skill hurt parameter, a skill hurt value of the character to be tested is calculated.

The skill hurt parameter can at least include an occupation type, a minimum hurt value, a maximum hurt value, a hit rate, and/or a crit rate of an attacked party. In an example of Tencent network game of QQ Defeat Dragon, skill hurt parameters are assumed and shown in Table 1.

TABLE 1

| Occupation type of a first character (Attacker) | Skill | Occupation type of a second character (Attacked party) | Minimum hurt value | maximum hurt value | Hit rate | Crit rate |
|---|---|---|---|---|---|---|
| Fan-Tian-Hun | Feng-Lei | Fan-Tian-Hun | 4006 | 5671 | 67.10% | 5.00% |
| | | Fan-Tian-Po | 4222 | 5934 | 67.10% | 5.00% |
| | | Shu-Shan-Jian | 4201 | 5908 | 67.10% | 4.63% |
| | | Shu-Shan-Qi | 4208 | 5917 | 66.30% | 5.00% |
| | | Xuan-Xin-Huo | 4208 | 5918 | 65.67% | 6.00% |
| | | Xuan-Xin-Bing | 4211 | 5921 | 68.19% | 6.00% |
| | Wan-Miao | Fan-Tian-Hun | 3958 | 5606 | 67.10% | 5.00% |
| | | Fan-Tian-Po | 4172 | 5867 | 67.10% | 5.00% |
| | | Shu-Shan-Jian | 4151 | 5842 | 67.10% | 4.63% |
| | | Shu-Shan-Qi | 4158 | 5851 | 66.30% | 5.00% |
| | | Xuan-Xin-Huo | 4159 | 5851 | 65.67% | 6.00% |
| | | Xuan-Xin-Bing | 4162 | 5855 | 68.19% | 6.00% |

Specifically, in one embodiment, an average skill hurt value per second (also referred to as "second hurt") caused by one party of the character to be tested continuously implementing specific skills to the other party can be calculated using formula 1. Theoretically, the higher the value of the second hurt, the better.

Formula 1 can be: skill hurt value=[(minimum hurt value+maximum hurt value)/2*skill hit rate+crit rate*critical strike hurt value]/(conjuring time), where the crit rate is an occurring probability of a crit when releasing a specific skill. The critical strike hurt value is the hurt caused to the attacked party when a crit occurs, which is often multiple times of the maximum hurt value. The conjuring time is generally called as a chanting stage corresponding to a hurt stage. The chanting stage is a stage that the skill starts releasing without generating an attack determination and can often be interrupted by some specific actions including moving, dizzying, forbidding magic, etc. Once interrupted, the attack determination does not appear.

Because practical PVP requires multiple continuous conjuring, after starting casting a certain specific skill, other skills cannot be case for a period of time (which can be referred to as public CD time). As disclosed herein, in other embodiments, the second hurt value of the character to be tested can be calculated using Formula 2.

Formula 2 can be: skill hurt value=[(minimum hurt value+maximum hurt value)/2*skill hit rate+crit rate*critical strike hurt value]/(conjuring time+public CD time).

In Step S212, the network game to be tested is implemented, additional effect data of a preset skill of the character to be tested are verified, and verifying results are obtained.

Because some specific skills contained in the network game to be tested can be preset to have some special additional effects, as pre-set, the script editing tool can be called to use the script language to compile verifying script of some specific skills having some special additional effects. The network game to be tested can be implemented via implementing the verifying script to verify the actual tested effect of these specific skills contained in the network game to be tested. These special additional effects can include Buff effect and Debuff effect. The Buff effect refers to an enhanced status in occupation skill properties and the goods properties of the character to be tested after certain skills are implemented, while the Debuff effect is, to the contrary, refers to a weakened status thereof.

In Step S213, the skill effect data of the character to be tested is counted, according to the calculating of the skill hurt value of the character to be tested and the verifying results. The skill effect data of the character to be tested can include a skill hurt grading obtained according to the skill hurt value and the additional effect data of the preset skill of the character to be tested.

The calculated results from Step S211 can be counted. Then according to the magnitude of the hurt value, the hurt value of all types of skills can be divided into four exemplary catalogs including high hurt, medium hurt, low hurt, and no hurt.

The verified results from Step S211 can be counted. Then according to the effect specialty, the actual tested specific effect by the verifying script can be divided into five catalogs including control, Buff, Debuff, cure, and special effect.

The counted calculating results and the verifying results can be summarized and can be used as the skill effect data of the character to be tested, as shown in Table 2, to be stored in the game client device for use when formulating the combat strategy.

TABLE 2

| Occupation type | Skill name | High hurt | Medium hurt | Low hurt | No hurt | Control | Buff | Debuff | Cure | Special effect |
|---|---|---|---|---|---|---|---|---|---|---|
| Fan-Tian-Hun | Feng-Lei | Y | | | | | | | | |
| | Wan-Miao | | Y | | | | | Y | | |

In Step S214, the combat strategy is formulated according to the counted skill effect data of the character to be tested.

According to the skill effect data of the character to be tested, the combat strategy can be formulated with formulated rules including: the skill casting priority can be set as high for a high skill hurt grading; multiple skills with additional special effect from continuous casting can be considered as an action strategy with casting priority; and the skill casting priority that can possibly weaken the status of the character to be tested can be set as low.

Figure 4:
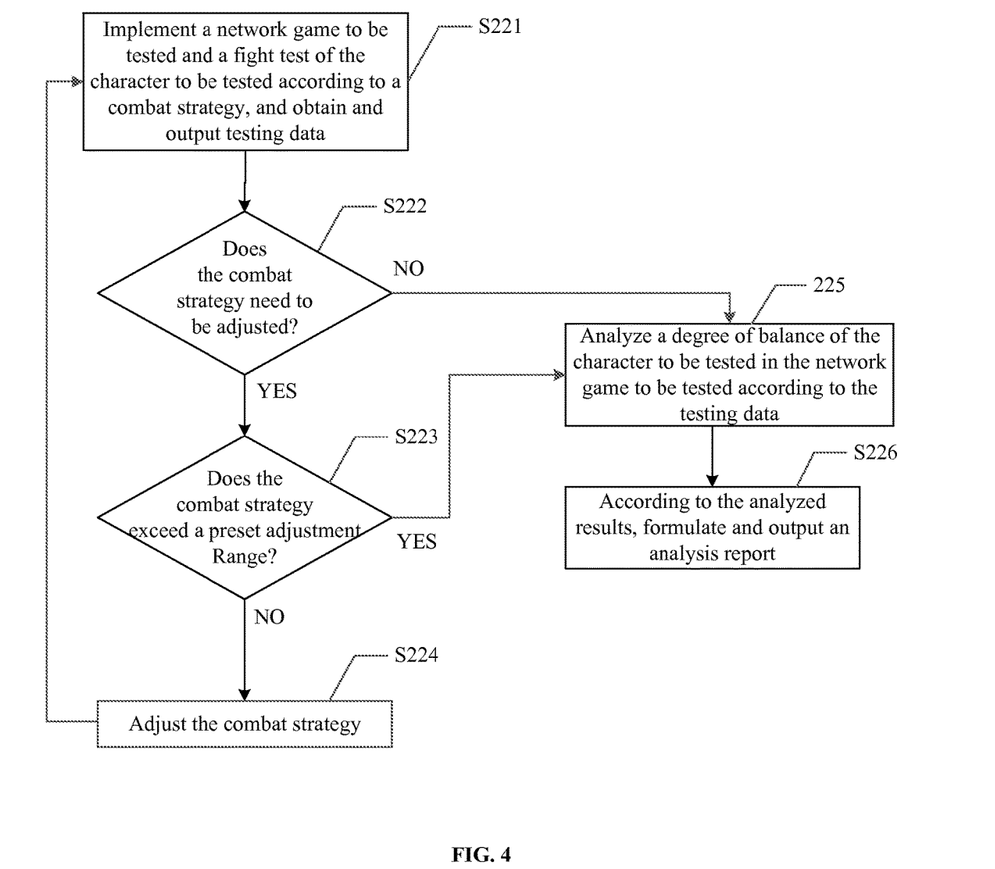
FIG. 4 is a flow chart of an exemplary Step S22 in FIG. 2 in accordance with various disclosed embodiments.

In Step S22, according to the combat strategy, the fight test of the character to be tested is implemented and the testing data is obtained and analyzed. As shown in FIG. 4, Step S22 may include following steps.

In Step S221, a network game to be tested is implemented; a fight test of the character to be tested is implemented in the network game, according to the combat strategy. The testing data can be obtained and outputted. This step can also refer to the corresponding content for Step S12 as described above.

In Step S222, whether the combat strategy needs to be adjusted is determined according to the testing data outputted from Step S221.

By analyzing whether at least a data portion of the testing data reaches a preset value, whether the combat strategy needs to be adjusted can be determined. For example, the skill hurt value can be determined whether is in a preset threshold range. When the skill hurt value is less than the preset threshold range, the skill corresponding to the skill hurt value can be considered that cannot achieve desired effect in a current testing, and the combat strategy needs to be optimized.

When it is determined that the combat strategy needs to be adjusted, Step S223 can be implemented by determining whether the combat strategy exceeds a preset adjustment range.

Because the preset occupation and its corresponding skills are limited in the game to be tested, room for the adjustment of the combat strategy can be limited. When the combat strategy is determined that exceeds the preset adjustment range, which generally means that the skill effect data and the status data of the character to be tested in the combat strategy exceeds a preset revisable value, and all the combat strategies are used up. At this time, no testing is needed.

When it is determined that the combat strategy does not exceed the preset adjustment range, Step S224 can be performed to adjust the combat strategy. Then Step S221 can be performed to implement the fight test of the character to be tested according to the adjusted combat strategy, and to obtain and test the testing data.

Figure 5:
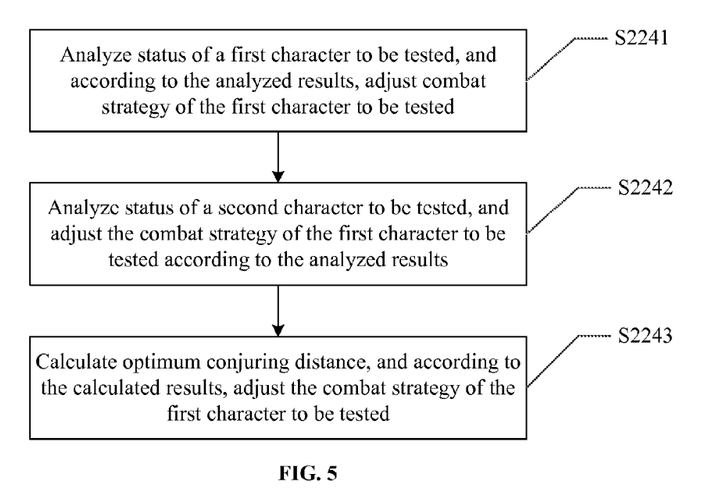
FIG. 5 is a flow chart of an exemplary Step S224 in FIG. 4 in accordance with various disclosed embodiments.

In other embodiments, when in Step S222 it is determined that the first character to be tested needs to adjust the combat strategy, Step S224 can be performed to adjust the combat strategy, e.g., as shown in FIG. 5.

In Step S2241, status of the first character to be tested is analyzed. According to the analyzed results, the combat strategy of the first character to be tested is adjusted.

Because the first character to be tested is continuously affected by the skills cast from itself and from the second character in a PVP fight, the status of the first character to be tested can change accordingly. For example, the first character to be tested can cast a skill with an enhanced effect on itself, or can suffer a valid attack cast from the second character to be tested that may weaken own status of the first character to be tested.

Analyzing the status of the first character to be tested can include, e.g., analyzing whether the key skill of the first character to be tested is temporarily on an un-casting status, whether the first character to be tested is on a controlled status by the second character to be tested, etc.

According to the analyzed results, adjusting the combat strategy of the first character to be tested can include, e.g., modifying and adjusting the skill priority related to the status of the first character to be tested. For example, when it is found from analyzing that the first character to be tested suffers a valid attack cast by the second character to be tested to weaken the status of the first character, e.g., on a status controlled by the second character to be tested, skill priority for relieving such controlling status can be increased.

In Step S2242, status of the second character to be tested is analyzed. The combat strategy of the first character to be tested is adjusted according to the analyzed results.

Like the first character to be tested, the second character to be tested is continuously affected by the skills cast from itself and from the first character in a PVP fight, the status of the second character to be tested can change accordingly. For example, the second character to be tested can cast a skill with an enhanced effect on itself, or can suffer a valid attack cast from the first character to be tested that may weaken own status of the second character to be tested.

Analyzing status of the second character to be tested can include, e.g., analyzing whether the second character to be tested is on an enhanced, weakened, or other abnormal status including increased defense, enhanced attack, being controlled, etc.

According to the analyzed result, the adjusting of the combat strategy of the first character to be tested can include, e.g., modifying and adjusting the skill priority related to status of the second character to be tested, adjusting the equipment data of the first character to be tested, etc. When it is analyzed to find that the second character to be tested is on a status with enhanced attack, the equipment data of the first character to be tested can be adjusted, and the equipment of the first character to be tested can be changed.

In Step S2243, the optimum conjuring distance is calculated, and according to the calculated results, the combat strategy of the first character to be tested is adjusted.

According to the analyzed results from Step S2241 and Step S2242, the optimum conjuring distance can be calculated. The optimum conjuring distance refers to a casting distance that can protect own safety can cast to provide maximum hurt, which is generally related to an attack range, a moving speed, and whether the skill is interrupted.

According to the calculated result, the adjusting of the combat strategy can include, e.g., adjusting a moving direction of the first character to be tested before and after casting the skill.

When the combat strategy is determined that does not need to be adjusted, or the combat strategy needs to be adjusted but the combat strategy exceeds the preset adjustment range, Step S225 can be implemented by analyzing a degree of balance of the character to be tested in the network game to be tested according to the testing data. This step may refer to Step S15 as described above.

In Step S226, according to the analyzed results, an analysis report is formulated and outputted. The analysis report can include testing data and analyzed results. Based on the analysis report, game designers can have a more detailed, comprehensive and objective understanding on the characters, occupations, skills, and/or other aspect in the network game to be tested, which can facilitate subsequent development of the network game.

The disclosed method for testing game data can combine theoretical data with the actual testing results; compile testing scripts according to combat strategies to implement network game to be tested; greatly simulate PVP combat processes in the network game to be tested; constantly adjust combat strategies during the combat according to status of fighting opponents. In this manner, the combat processed can be more close to actual operations of the players. Probability of fight winning of the character to be tested can be obtained under the condition that the player does not mistakenly perform operations. Characters in the game, and/or skill level can be objectively reflected. Interference of the skill level of the players or other factors can be eliminated. Objectivity of the testing data can be improved and the testing time can be reduced, thereby increasing testing efficiency.

Figure 6:
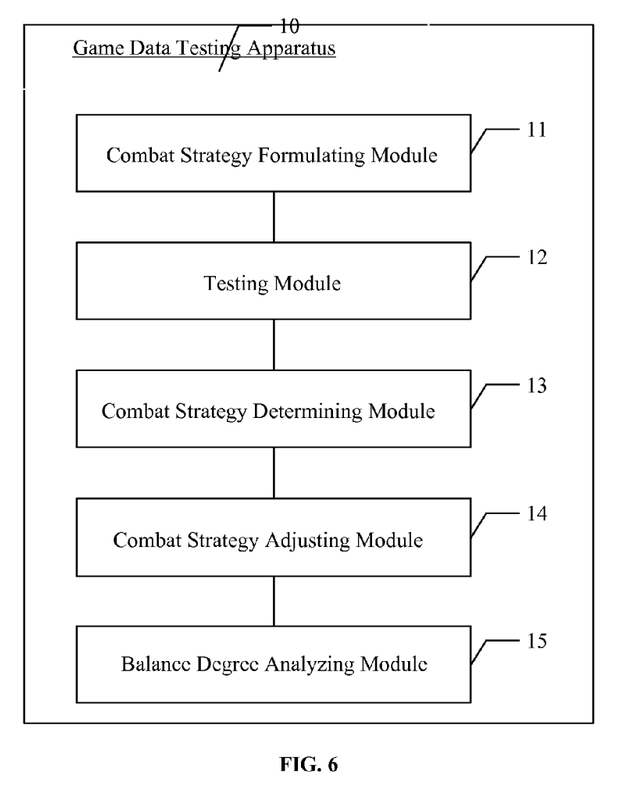
FIG. 6 depicts an exemplary apparatus for testing game data in accordance with various disclosed embodiments.

FIG. 6 depicts an exemplary apparatus for testing game data in accordance with various disclosed embodiments. The exemplary apparatus for testing game data can be used to test network game data and can include a game data testing apparatus 10. The game data testing apparatus 10 can include a combat strategy formulating module 11, a testing module 12, a combat strategy determining module 13, a combat strategy adjusting module 14, and/or a balance degree analyzing module 15 of the character to be tested according to the FIG. 6.

The combat strategy formulating module 11 is configured to obtain skill effect data of a character to be tested and to formulate a combat strategy according to the skill effect data of the character to be tested.

The testing module 12 is configured to implement a network game to be tested, to implement a fight test of the character to be tested in the network game according to the combat strategy formulated by the combat strategy formulating module 11 and provide testing data, and to obtain and output the testing data.

The combat strategy deciding module 13 is configured to determine whether the combat strategy needs to be adjusted according to the testing data outputted by the testing module 12.

The combat strategy adjusting module 14 is configured, when the combat strategy is determined that needs to be adjusted by the combat strategy determining module 13, to adjust the combat strategy, to call the testing module 12 to implement the fight test of the character to be tested according to the adjusted combat strategy, and to obtain the testing data.

The balance degree analyzing module 15 of the character to be tested is configured, when the combat strategy is determined that does not need to be adjusted by the combat strategy determining module 13, to analyze a degree of balance of the character to be tested in the network game to be tested according to the testing data outputted by the testing module 12.

In one embodiment, the testing data can include a fight winning rate, skill hurt data, controlled time data, status data, and effective actions per minute of the character to be tested. In one embodiment, the skill effect data of the character to be tested can include: skill hurt grading data, additional effect data of a skill, equipment parameter data, optimum conjuring distance data of a skill, or status data of a key skill, of the character to be tested.

Each module depicted in the exemplary game data testing apparatus 10 can be functioned as depicted accordingly in FIGS. 1-5.

The disclosed apparatus for testing game data can combine theoretical data with the actual testing results; compile testing scripts according to combat strategies to implement network game to be tested; greatly simulate PVP combat processes in the network game to be tested; constantly adjust combat strategies during the combat according to status of fighting opponents. In this manner, the combat processed can be more close to actual operations of the players. Probability of fight winning of the character to be tested can be obtained under the condition that the player does not mistakenly perform operations. Characters in the game, and/or skill level can be objectively reflected. Interference of the skill level of the players or other factors can be eliminated. Objectivity of the testing data can be improved and the testing time can be reduced, thereby increasing testing efficiency.

Figure 7:
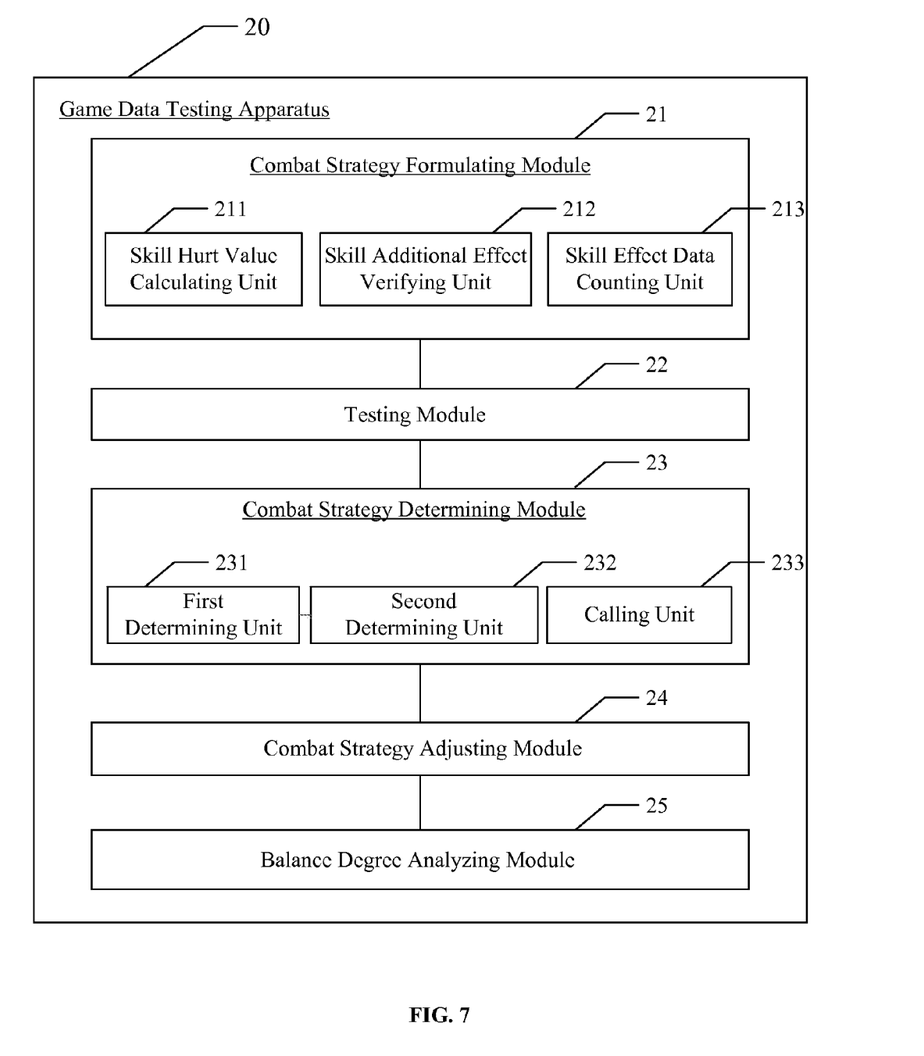
FIG. 7 depicts another exemplary apparatus for testing game data in accordance with various disclosed embodiments.

FIG. 7 depicts another exemplary apparatus for testing game data in accordance with various disclosed embodiments. The exemplary apparatus for testing game data can be used to test network game data and can include a game data testing apparatus. As shown in FIG. 7, an exemplary testing apparatus 20 can include a combat strategy formulating module 21, a testing module 22, a combat strategy deciding module 23, a combat strategy adjusting module 24, and/or a balance degree analyzing module 25 of the character to be tested.

The combat strategy formulating module 21 is configured to obtain the skill effect data of the character to be tested and to formulate the combat strategy according to the skill effect data of the character to be tested. The character to be tested can include a first character to be tested and a second character to be tested. The combat strategy can include the combat strategy of the first character to be tested and the combat strategy of the second character to be tested.

The combat strategy formulating module 21 further includes a skill hurt value calculating unit 211, a skill additional effect verifying unit 212, and/or a skill effect data counting unit 213.

The skill hurt value calculating unit 211 is configured to calculate a skill hurt value of the character to be tested according to a skill hurt parameter, the skill hurt parameter at least including an occupation type, a minimum hurt value, a maximum hurt value, a hit rate, and a crit rate of an attacked party.

The skill additional effect verifying unit 212 is configured to implement the network game to be tested, to verify additional effect data of a preset skill of the character to be tested, and to obtain verifying results.

The skill effect data counting unit 213 is configured to count the skill effect data of the character to be tested, according to the skill hurt value of the character to be tested calculated by the skill hurt value calculating unit and the verifying results obtained by the skill additional effect verifying unit, wherein the skill effect data of the character to be tested includes: a skill hurt grading obtained according to the skill hurt value and the additional effect data of the preset skill of the character to be tested.

The testing module 22 is configured to implement a network game to be tested, to implement a fight test of the character to be tested in the network game according to the combat strategy formulated by the combat strategy formulating module 21 and provide testing data, and to obtain and output the testing data.

The testing module 22 is further configured to count and output the testing data according to a testing request inputted by a user. The testing data can include a fight winning rate, skill hurt data, controlled time data, status data, and effective actions per minute of the character to be tested.

The combat strategy deciding module 23 is configured to determine whether the combat strategy needs to be adjusted according to the testing data outputted by the testing module 22.

The combat strategy determining module 23 can include a first deciding unit 231, a second deciding unit 232, and/or a calling unit 233.

The first determining unit 231 is configured to determine whether at least a data portion of the testing data outputted by the testing module has not reached a preset value.

The second determining unit 232 is configured, when the first determining unit determines that the data portion does not reach the preset value, to determine whether the combat strategy exceeds a preset adjustment range. The second determining unit 232 is further configured, when the first determining unit determines that the data portion reaches the preset value, to implement steps of adjusting the combat strategy, to implement the fight test of the character to be tested according to the adjusted combat strategy, and to obtain the testing data.

When the first determining unit determines that the data portion reaches the preset value, or when the first determining unit determines that the data portion does not reach the preset value and the second determining unit determines that the combat strategy exceeds the preset adjustment range, the calling unit 233 is configured to call the balance degree analyzing module to analyze the degree of balance of the character to be tested in the network game to be tested according to the testing data outputted by the testing module.

The combat strategy adjusting module 24 is configured, when the combat strategy is determined that needs to be adjusted by the combat strategy determining module 23, to adjust the combat strategy, to call the testing module 22 to implement the fight test of the character to be tested according to the adjusted combat strategy, and to obtain the testing data. The combat strategy adjusting module 24 is further configured to adjust the combat strategy by modifying equipment parameter data, skill selecting priority data, or skill optimum conjuring distance data of the character to be tested.

When the combat strategy is determined that does not need to be adjusted by the combat strategy determining module 23, the balance degree analyzing module 25 is configured to analyze a degree of balance of the character to be tested in the network game to be tested according to the testing data outputted by the testing module.

Each module depicted in the exemplary testing apparatus 20 can be functioned as depicted accordingly in FIGS. 1-5.

The disclosed testing apparatus can combine theoretical data with the actual testing results; compile testing scripts according to combat strategies to implement network game to be tested; greatly simulate PVP combat processes in the network game to be tested; constantly adjust combat strategies during the combat according to status of fighting opponents. In this manner, the combat processed can be more close to actual operations of the players. Probability of fight winning of the character to be tested can be obtained under the condition that the player does not mistakenly perform operations. Characters in the game, and/or skill level can be objectively reflected. Interference of the skill level of the players or other factors can be eliminated. Objectivity of the testing data can be improved and the testing time can be reduced, thereby increasing testing efficiency.

Various embodiments also provide a computer storage medium. The computer storage medium may store a program. Execution of the program includes some or all of the steps of the exemplary methods for testing game data as disclosed herein.

The modules and/or units included herein are described according to their functional logic, but are not limited to the above descriptions as long as the modules/units can implement corresponding functions. Further, the specific name of each functional unit is used for distinguishing from on another without limiting the protection scope of the present disclosure. In various embodiments, the disclosed modules/units can be configured in one apparatus or configured in multiple apparatus as desired. The modules/units disclosed herein can be integrated in one module/unit/apparatus or in multiple modules/units/apparatus. Each of the modules/units/disclosed herein can be divided into one or more sub-modules/units/, which can be recombined in any manner.

Note that suitable software and/or hardware (e.g., a universal hardware platform) may be included and used in the disclosed methods and apparatus. For example, the disclosed embodiments can be implemented by hardware only, which alternatively can be implemented by software products only. The software products can be stored in a computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

The term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a . . . " does not exclude other elements included in the process, method, article, or apparatus having those elements.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The embodiments disclosed herein are exemplary only. The order by which the foregoing examples of the present disclosure are presented merely reflects the convenience of description. It does not imply the preference among the examples. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods and apparatus for testing game data are provided. In a network game to be tested, skill effect data of a character to be tested can be obtained, and a combat strategy can be formulated accordingly. The network game along with a fight test of the character can be implemented, according to the combat strategy, to obtain and output testing data. Whether the combat strategy needs to be adjusted can then be determined. When the combat strategy is determined that needs to be adjusted, the methods and apparatus can be used to adjust the combat strategy, implement the fight test of the character according to the adjusted combat strategy, and obtain the testing data. When the combat strategy is determined that does not need to be adjusted, the methods and apparatus can be used to analyze a degree of balance of the character in the network game.

The disclosed methods and apparatus for testing game data can combine theoretical data with the actual testing results; compile testing scripts according to combat strategies to implement network game to be tested; greatly simulate PVP combat processes in the network game to be tested; constantly adjust combat strategies during the combat according to status of fighting opponents. In this manner, the combat processed can be more close to actual operations of the players. Probability of fight winning of the character to be tested can be obtained under the condition that the player does not mistakenly perform operations. Characters in the game, and/or skill level can be objectively reflected. Interference of the skill level of the players or other factors can be eliminated. Objectivity of the testing data can be improved and the testing time can be reduced, thereby increasing testing efficiency.

What is claimed is:

1. A method for testing game data implemented by a game client device including at least a processor, comprising:
   obtaining, by the processor, skill effect data of a character to be tested;
   formulating, by the processor, a combat strategy according to the skill effect data of the character to be tested;
   according to the combat strategy, compiling, by the processor, a testing script using a script editing tool;
   implementing, by the processor, a network game to be tested via implementing the testing script;
   simulating, by the processor, a fight test of the character to be tested in the network game, according to the combat strategy in the testing script and providing testing data;
   obtaining and outputting, by the processor, the testing data;
   according to the testing data, determining, by the processor, whether the combat strategy needs to be adjusted; and
   when the combat strategy is determined that needs to be adjusted, adjusting, by the processor, the combat strategy, re-compiling, by the processor, the testing script according to the adjusted combat strategy, implementing, by the processor, the fight test of the character to be tested according to the adjusted combat strategy via implementing the re-complied testing script, and obtaining, by the processor, the testing data; or
   when the combat strategy is determined that does not need to be adjusted, analyzing, by the processor, a degree of balance of the character to be tested in the network game to be tested according to the testing data, the testing data including fight winning probability of the character to be tested without operation mistakes of players;
   wherein:
   the fight test is simulated between a first character to be tested and a second character to be tested; and
   the method further comprises:
     analyzing, by the processor, a status of the first character to be tested, including analyzing whether the first character to be tested is on a controlled status by the second character to be tested;
     when the first character to be tested is on the controlled status by the second character to be tested, adjusting, by the processor, the combat strategy of the first character to be tested by increasing a priority of a skill for relieving such controlled status;
     analyzing, by the processor, a status of the second character to be tested, including analyzing whether the second character to be tested is on an enhanced, weakened, or other abnormal status;
     adjusting, by the processor, the combat strategy of the first character to be tested according to the analyzed status of the second character to be tested, including: modifying a priority of a kill related to the status of the second character to be tested, and adjusting an equipment data of the first character to be tested;
     calculating, by the processor, a conjuring distance of a corresponding skill according to the analyzed results of the first character to be tested and the analyzed results of the second character to be tested; and
     adjusting, by the processor, the combat strategy of the first character to be tested according to the calculated conjuring distance, including adjusting a moving direction of the first character to be tested before and after casting the corresponding skill.

2. The method according to claim 1, wherein obtaining, by the processor, the skill effect data of the character to be tested includes:
   calculating a skill hurt value of the character to be tested according to a skill hurt parameter, the skill hurt parameter at least including an occupation type, a minimum hurt value, a maximum hurt value, a hit rate, and a crit rate of an attacked party;
   implementing the network game to be tested;
   verifying additional effect data of a preset skill;
   obtaining verifying results; and
   counting the skill effect data of the character to be tested, according to the calculating of the skill hurt value of the character to be tested and the verifying results of a plurality of skills possessed by the character to be tested, the skill effect data of the character to be tested including: a skill hurt grading obtained according to the skill hurt value and the additional effect data of the preset skill of the character to be tested.

3. The method according to claim 1, wherein determining, by the processor, whether the combat strategy needs to be adjusted according to the testing data includes:
  determining whether at least a data portion of the testing data reaches a preset value;
  when the data portion does not reach the preset value, determining whether the combat strategy exceeds a preset adjustment range; and
  when the combat strategy does not exceed the preset adjustment range, implementing steps of adjusting the combat strategy, implementing the fight test of the character to be tested according to the adjusted combat strategy, and obtaining the testing data; or
  when the combat strategy exceeds the preset adjustment range, analyzing the degree of balance of the character to be tested in the network game to be tested according to the testing data.

4. The method according to claim 1, wherein obtaining and outputting, by the processor, the testing data includes:
  counting and outputting the testing data according to a testing request inputted by a user, the testing data including a fight winning rate, skill hurt data, controlled time data, status data, and effective actions per minute of the character to be tested.

5. The method according to claim 4, wherein the skill effect data of the character to be tested includes: skill hurt grading data, additional effect data of a skill, equipment parameter data, optimum conjuring distance data of a skill, or status data of a key skill, of the character to be tested.

6. An apparatus for testing game data, comprising at least a processor configured:
  to obtain skill effect data of a character to be tested, to formulate a combat strategy according to the skill effect data of the character to be tested, and to compile a testing script using a script editing tool according to the combat strategy;
  to implement a network game to be tested via implementing the testing script, to implement a fight test of the character to be tested in the network game according to the combat strategy in the testing script and provide testing data, and to obtain and output the testing data;
  to determine whether the combat strategy needs to be adjusted according to the testing data;
  when the combat strategy is determined that needs to be adjusted, to adjust the combat strategy, to re-compile the testing script according to the adjusted combat strategy, to implement the fight test of the character to be tested according to the adjusted combat strategy via implementing the re-complied testing script, and to obtain the testing data; and
  when the combat strategy is determined that does not need to be adjusted, to analyze a degree of balance of the character to be tested in the network game to be tested according to the testing data, the testing data including fight winning probability of the character to be tested without operation mistakes of players;
  wherein:
  the fight test is simulated between a first character to be tested and a second character to be tested; and
  the processor is further configured to:
    analyze a status of the first character to be tested, including analyzing whether the first character to be tested is on a controlled status by the second character to be tested;
    when the first character to be tested is on the controlled status by the second character to be tested, adjust the combat strategy of the first character to be tested by increasing a priority of a skill for relieving such controlled status;
    analyze a status of the second character to be tested, including analyzing whether the second character to be tested is on an enhanced, weakened, or other abnormal status;
    adjust the combat strategy of the first character to be tested according to the analyzed status of the second character to be tested, including: modifying a priority of a kill related to the status of the second character to be tested, and adjusting an equipment data of the first character to be tested;
    calculate a conjuring distance of a corresponding skill according to the analyzed results of the first character to be tested and the analyzed results of the second character to be tested; and
    adjust the combat strategy of the first character to be tested according to the calculated conjuring distance, including adjusting a moving direction of the first character to be tested before and after casting the corresponding skill.

7. The apparatus according to claim 6, wherein the processor is further configured:
  to calculate a skill hurt value of the character to be tested according to a skill hurt parameter, the skill hurt parameter at least including an occupation type, a minimum hurt value, a maximum hurt value, a hit rate, and a crit rate of an attacked party;
  to implement the network game to be tested, to verify additional effect data of a preset skill of the character to be tested, and to obtain verifying results; and
  to count the skill effect data of the character to be tested, according to the skill hurt value of the character to be tested of a plurality of skills possessed by the character to be tested and the verifying results of the plurality of skills possessed by the character to be tested, wherein the skill effect data of the character to be tested includes: a skill hurt grading obtained according to the skill hurt value and the additional effect data of the preset skill of the character to be tested.

8. The apparatus according to claim 6, wherein the processor is further configured:
  to determine whether at least a data portion of the testing data has not reached a preset value;
  when the data portion does not reach the preset value, to determine whether the combat strategy exceeds a preset adjustment range,
  wherein the processor is further configured, when the data portion reaches the preset value, to implement steps of adjusting the combat strategy, to implement the fight test of the character to be tested according to the adjusted combat strategy, and to obtain the testing data; and
  when the data portion reaches the preset value, or when the data portion does not reach the preset value and the combat strategy exceeds the preset adjustment range, to analyze the degree of balance of the character to be tested in the network game to be tested according to the testing data.

9. The apparatus according to claim 6, wherein the processor is further configured to adjust the combat strategy by modifying equipment parameter data, skill selecting priority data, or skill optimum conjuring distance data of the character to be tested.

10. The apparatus according to claim 6, wherein the processor is further configured to count and output the testing data according to a testing request inputted by a user, the testing data including a fight winning rate, skill hurt data, controlled time data, status data, and effective actions per minute of the character to be tested.

11. The apparatus according to claim 10, wherein the skill effect data of the character to be tested includes: skill hurt grading data, additional effect data of a skill, equipment parameter data, optimum conjuring distance data of a skill, or status data of a key skill, of the character to be tested.

12. A non-transitory computer-readable medium having computer program for, when being executed by a processor, performing a method for testing game data, the method comprising:
   obtaining, by the processor, skill effect data of a character to be tested;
   formulating, by the processor, a combat strategy according to the skill effect data of the character to be tested;
   according to the combat strategy, compiling, by the processor, a testing script using a script editing tool;
   implementing, by the processor, a network game to be tested via implementing the testing script;
   implementing, by the processor, a fight test of the character to be tested in the network game, according to the combat strategy in the testing script and providing testing data;
   obtaining and outputting, by the processor, the testing data;
   according to the testing data, determining, by the processor, whether the combat strategy needs to be adjusted; and
   when the combat strategy is determined that needs to be adjusted, adjusting the combat strategy, re-compiling, by the processor, the testing script according to the adjusted combat strategy, implementing, by the processor, the fight test of the character to be tested according to the adjusted combat strategy via implementing the re-complied testing script, and obtaining, by the processor, the testing data; or
   when the combat strategy is determined that does not need to be adjusted, analyzing, by the processor, a degree of balance of the character to be tested in the network game to be tested according to the testing data, the testing data including fight winning probability of the character to be tested without operation mistakes of players;
   wherein:
   the fight test is simulated between a first character to be tested and a second character to be tested; and
   the method further comprises:
      analyzing, by the processor, a status of the first character to be tested, including analyzing whether the first character to be tested is on a controlled status by the second character to be tested;
      when the first character to be tested is on the controlled status by the second character to be tested, adjusting, by the processor, the combat strategy of the first character to be tested by increasing a priority of a skill for relieving such controlled status;
      analyzing, by the processor, a status of the second character to be tested, including analyzing whether the second character to be tested is on an enhanced, weakened, or other abnormal status;
      adjusting, by the processor, the combat strategy of the first character to be tested according to the analyzed status of the second character to be tested, including:
         modifying a priority of a kill related to the status of the second character to be tested, and adjusting an equipment data of the first character to be tested;
      calculating, by the processor, a conjuring distance of a corresponding skill according to the analyzed results of the first character to be tested and the analyzed results of the second character to be tested; and
      adjusting, by the processor, the combat strategy of the first character to be tested according to the calculated conjuring distance, including adjusting a moving direction of the first character to be tested before and after casting the corresponding skill.

13. The non-transitory computer-readable medium according to claim 12, wherein obtaining, by the processor, the skill effect data of the character to be tested includes:
   calculating a skill hurt value of the character to be tested according to a skill hurt parameter, the skill hurt parameter at least including an occupation type, a minimum hurt value, a maximum hurt value, a hit rate, and a crit rate of an attacked party;
   implementing the network game to be tested;
   verifying additional effect data of a preset skill;
   obtaining verifying results; and
   counting the skill effect data of the character to be tested, according to the calculating of the skill hurt value of the character to be tested and the verifying results of a plurality of skills possessed by the character to be tested, the skill effect data of the character to be tested including: a skill hurt grading obtained according to the skill hurt value and the additional effect data of the preset skill of the character to be tested.

14. The non-transitory computer-readable medium according to claim 12, wherein determining, by the processor, whether the combat strategy needs to be adjusted according to the testing data includes:
   determining whether at least a data portion of the testing data reaches a preset value;
   when the data portion does not reach the preset value, determining whether the combat strategy exceeds a preset adjustment range; and
   when the combat strategy does not exceed the preset adjustment range, implementing steps of adjusting the combat strategy, implementing the fight test of the character to be tested according to the adjusted combat strategy, and obtaining the testing data; or
   when the combat strategy exceeds the preset adjustment range, analyzing the degree of balance of the character to be tested in the network game to be tested according to the testing data.

15. The non-transitory computer-readable medium according to claim 12, the method further including: adjusting the combat strategy by modifying equipment parameter data, skill selecting priority data, or skill optimum conjuring distance data of the character to be tested.

16. The non-transitory computer-readable medium according to claim 12, wherein obtaining and outputting, by the processor, the testing data includes:
   counting and outputting the testing data according to a testing request inputted by a user, the testing data including a fight winning rate, skill hurt data, controlled time data, status data, and effective actions per minute of the character to be tested.

17. The non-transitory computer-readable medium according to claim 16, wherein the skill effect data of the character to be tested includes: skill hurt grading data, additional effect data of a skill, equipment parameter data, optimum conjuring distance data of a skill, or status data of a key skill, of the character to be tested.

18. The apparatus according to claim 7, wherein:

the skill hurt value of the character to be tested is calculated according to the following formula:

skill hurt value=[(minimum hurt value+maximum hurt value)/2*skill hit rate+crit rate* critical strike hurt value]/(conjuring time+public cooldown time), the public cooldown time being a period of time that other skills cannot be cast after starting casting a specific skill.

19. The apparatus according to claim 6, wherein:

the fight test is simulated between a first character to be tested and a second character to be tested; and the processor is further configured to:

- determine that an occupation used by the first character to be tested restrains an occupation used by the second character to be tested, when an arbitrary strategy selected from multiple combat strategies for the occupation used by the first character to be tested restrains all of combat strategies of the occupation used by the second character to be tested;
- determine that the occupation used by the first character to be tested has a stronger positioning in the network game to be tested, when occupations used by the second characters are all screened out for not restraining the occupation used by the first character to be tested;
- determine that the occupation used by the first character to be tested has a weaker positioning in the network game to be tested, when the occupation used by the first character to be tested does not have any combat strategies that can achieve a relatively higher winning rate in fight tests with multiple occupations; or
- determine that an operative difficulty index of the occupation used by the first character to be tested is relatively higher, when there are mutual chances for victory and defeat between the occupation used by the first character to be tested and the occupation used by the second character to be tested, and the first character to be tested requires a higher effective actions per minute than the second character to be tested.

* * * * *